United States Patent
Max et al.

(10) Patent No.: US 11,460,860 B2
(45) Date of Patent: Oct. 4, 2022

(54) SWARM-BASED TRAJECTORIES FOR MOTOR VEHICLES

(71) Applicant: Volkswagen Aktiengesellschaft, Wolfsburg (DE)

(72) Inventors: Stephan Max, Gifhorn (DE); Sebastian Hamel, Braunschweig (DE); Timur Aminev, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 111 days.

(21) Appl. No.: 16/969,906

(22) PCT Filed: Jan. 23, 2019

(86) PCT No.: PCT/EP2019/051669
§ 371 (c)(1),
(2) Date: Aug. 13, 2020

(87) PCT Pub. No.: WO2019/162027
PCT Pub. Date: Aug. 29, 2019

(65) Prior Publication Data
US 2021/0034072 A1  Feb. 4, 2021

(30) Foreign Application Priority Data
Feb. 22, 2018  (DE) .......................... 102018202712.9

(51) Int. Cl.
G05D 1/02   (2020.01)
G08G 1/01   (2006.01)

(52) U.S. Cl.
CPC ......... *G05D 1/0287* (2013.01); *G05D 1/0214* (2013.01); *G08G 1/0112* (2013.01);
(Continued)

(58) Field of Classification Search
CPC .............. G05D 1/0287; G05D 1/0214; G05D 2201/0213; G05D 1/0217; G05D 1/0293;
(Continued)

(56) References Cited

U.S. PATENT DOCUMENTS 9,079,587 B1   7/2015 Rupp et al.
2014/0129073 A1   5/2014 Ferguson
(Continued)

FOREIGN PATENT DOCUMENTS

DE   102011083677 A1   4/2013
DE   102013019112 A1   5/2015
(Continued)

OTHER PUBLICATIONS

PCT/EP2019/051669. International Search Report (dated May 16, 2019).

*Primary Examiner* — Rodney A Butler
(74) *Attorney, Agent, or Firm* — Loza & Loza, LLP; Peter Zura

(57) ABSTRACT

Technologies and techniques for producing swarm trajectories for a specified lane of a roadway section, wherein a plurality of vehicles driving in the specified lane transmits the respective driving trajectories of the vehicles to a back-end computer, which determines a swarm trajectory for the specified lane from the transmitted trajectories. The vehicles determine specified constraints during driving in the lane, and the determined constraints are transmitted to the back-end computer together with the trajectory in question. The back-end computer determines at least one swarm trajectory for the specified lane as a function of at least one constraint from the transmitted trajectories and the constraints.

18 Claims, 2 Drawing Sheets

(52) U.S. Cl.
CPC ......... *G08G 1/0129* (2013.01); *G08G 1/0133* (2013.01); *G05D 2201/0213* (2013.01)

(58) Field of Classification Search
CPC .. G08G 1/0112; G08G 1/0129; G08G 1/0133; G08G 1/0145; B60W 2050/0075; B60W 2556/10; B60W 2554/00; B60W 2555/20; B60W 2556/45; B60W 30/10
See application file for complete search history.

(56) References Cited

U.S. PATENT DOCUMENTS

| | | | |
|---|---|---|---|
| 2016/0275404 A1* | 9/2016 | Abraham | G06Q 10/20 |
| 2017/0287335 A1 | 10/2017 | Ansari | |
| 2018/0059687 A1* | 3/2018 | Hayes | G05D 1/0005 |
| 2018/0370533 A1* | 12/2018 | Sofra | B60W 30/10 |

FOREIGN PATENT DOCUMENTS

| | | |
|---|---|---|
| DE | 102015115164 A1 | 3/2017 |
| DE | 102015014651 A1 | 5/2017 |
| DE | 102016212292 A1 | 8/2017 |
| WO | 2017081035 A1 | 5/2017 |

* cited by examiner

SWARM-BASED TRAJECTORIES FOR MOTOR VEHICLES

RELATED APPLICATIONS

The present application claims priority to international patent app. no. PCT/EP2019/051669 to Stephan Max, et al., filed Jan. 23, 2019, which claims priority to German patent app. no. DE 2018 202 712.9, filed Feb. 22, 2018, the contents of each being incorporated by reference in their entirety herein.

BACKGROUND

The present disclosure relates to a method for generating swarm trajectories for motor vehicles.

Regarding traffic as a swarm of motor vehicles has become a common practice in traffic research. By way of example, a swarm-based simulation of traffic is used effectively to optimize traffic light phases at heavily frequented intersections.

When the trajectories of numerous vehicles, e.g., a vehicle swarm, are then observed on a section of a road, the trajectories of the individual vehicles on the section of the road normally differ. It is therefore possible to define an average path taken by the observed vehicle swarm, which is referred to as the swarm trajectory for that section of the road.

If a vehicle is traveling independently on a section of a road, e.g. a highway, the trajectory is normally centered between the lane markings. The trajectories that are driven on a section of the road are sent to a back-end computer that then determines a swarm trajectory for that section of road from numerous trajectories obtained from different vehicles. These swarm trajectories for a section of a road can then be retrieved from the back-end computer by another vehicle on that section of the road in order to compare its trajectory with the swarm trajectory, and potentially make adjustments. This may be useful with assisted driving, in construction areas, or in areas without lane markings for planning or optimizing its trajectory.

The swarm trajectories described above are stored time-independently by the back-end computer and then provided to the user for the section of road in question.

An "ideal" trajectory, however, is dependent on boundary conditions in some areas of a road, in particular in urban areas, because an ideal trajectory depends to a large extent on the traffic conditions at a specific time on the section of road in question, parked vehicles on the side of the road, etc.

These conditions result in a number problems. If a swarm trajectory is determined in the normal manner, a mixture of trajectories is obtained with different boundary conditions. Consequently, the swarm trajectory is no longer sufficiently adequate in the worst cases.

Furthermore, the driver in a motor vehicle expects a trajectory adapted to the boundary conditions. Therefore, even if a trajectory has been driven in accordance with a boundary condition, this may not be regarded as ideal by the driver if other boundary conditions come into play.

DE 10 2016 212 292 A1 relates to a method for providing a trajectory plan for a motor vehicle, comprising the following steps: receiving environment data for the area in which the motor vehicle is located, providing a state space for a predefined planning horizon in which the state space comprises numerous states of the motor vehicle in the environment described by the environment data, selecting a subset of the numerous states from the state space based on at least one selection criterion, generating a search graph in which the selected states each represent nodes on the search graph, dividing the search graph into at least two temporally or spatially successive subsections of numerous trajectory candidates that are calculated in parallel and assessed in each of the subsections based on at least one assessment criterion, and subsequently: compiling a trajectory plan for the given planning horizon from individually calculated trajectory candidates in which those trajectory candidates connected to one another over the subsections that have the highest ratings are selected.

DE 10 201 1 083 677 A1 proposes a method for determining the prognosis for a traffic situation for a vehicle in which at least one possible future for the traffic situation in which the vehicle is involved is determined based on a current state of the vehicle and historical data.

For current considerations and intended uses, the determining of the swarm trajectory for given section of a roads takes place statically, such that the use of a swarm trajectory that has once been determined may lead to unsatisfactory results in some circumstances.

Accordingly, there is a need in the art to be able to obtain better swarm trajectories, such that the use of a swarm trajectory in an ego-vehicle leads to a satisfying driving experience for the driver.

BRIEF DESCRIPTION OF THE DRAWINGS

Various embodiments are illustrated below in reference to the drawings. Therein.

DETAILED DESCRIPTION

Figure 1:
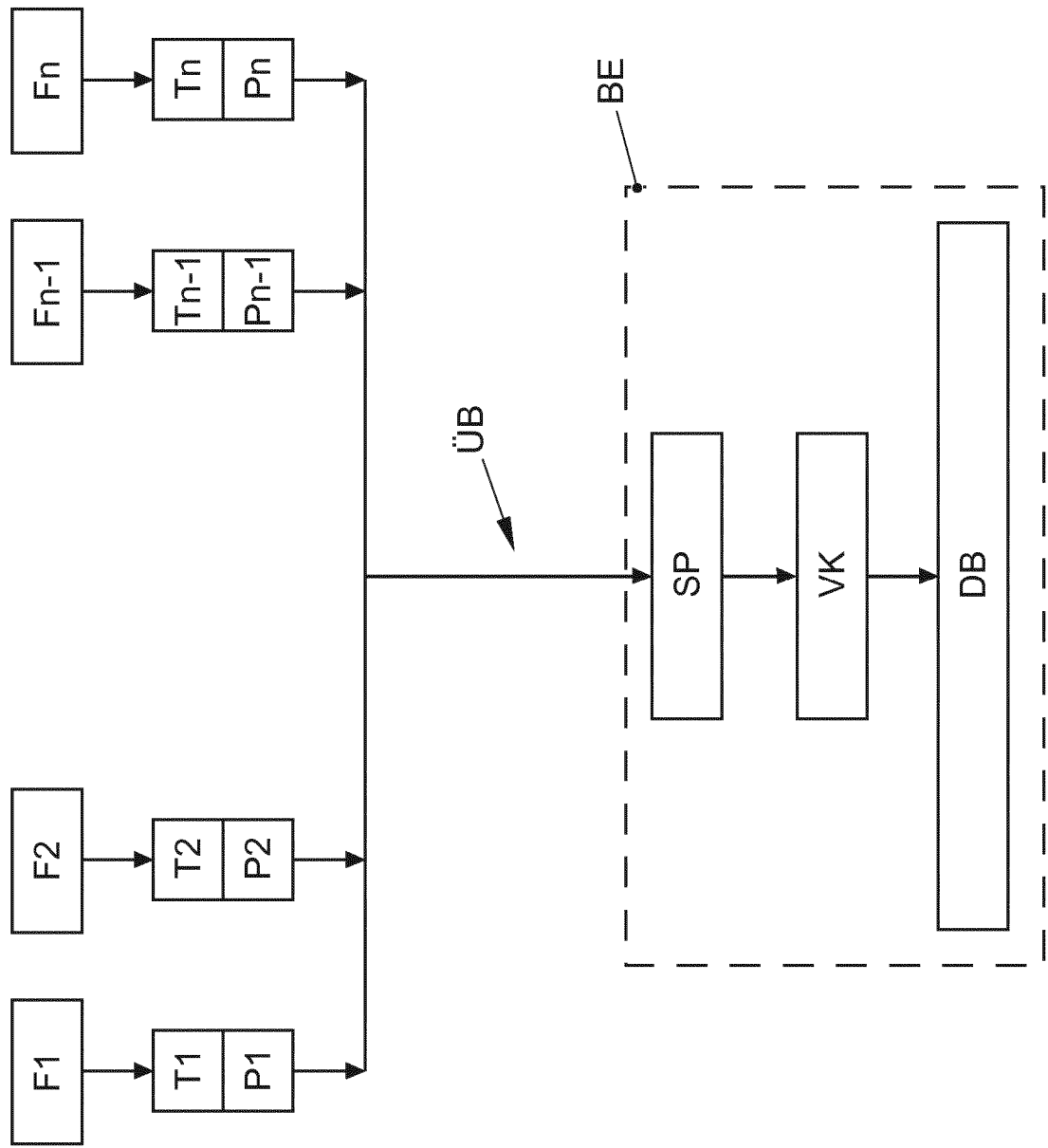
FIG. 1 shows the method for determining swarm trajectories in a schematic illustration.

Various technologies and techniques are disclosed to determine a swarm trajectory for a section of a road. In some examples, numerous vehicles traveling in a given lane transmit their respective trajectories to a back-end computer, which then determines and stores a swarm trajectory from the trajectories it has received for a given lane.

By determining the prevailing boundary conditions when driving in the lane in question in parallel to trajectories, swarm trajectories specific to boundary conditions are determined and stored, such that these boundary condition-specific swarm trajectories can be made available to other drivers in the lane.

Preferably, the swarm trajectories determined from the trajectories in conjunction with the boundary conditions are stored in a data base, and swarm trajectories are determined for given boundary conditions and/or possible combinations of given boundary conditions for the given lane.

At least the time of day is also preferably added as a boundary condition for the trajectories that are to be determined, wherein the time of day can relate in particular to driving time intervals, e.g., hour intervals or minute intervals. The time of day may be utilized as boundary condition, which is determined and conveyed. This is primarily because some traffic conditions, e.g., traffic congestion in a lane of a given section of road, are normally dependent on the when the vehicle is travelling in the section in question.

The date, the day of the week, the weather, traffic conditions, parking situations on the side of the road, the state of the road, and/or the lighting with regard to the given lane, can also be defined as further boundary conditions, and added to the respective trajectories that are to be determined. This list of possible boundary conditions is not to be regarded as exhaustive in the present disclosure.

In some examples, the configured boundary conditions may also be weighted differently when creating the boundary condition-specific swarm trajectories. This may be advantageous, for example, when the swarm trajectory is a function of a combination of boundary conditions, e.g. the date, weekday, time of day, and parking situation. If the date is a holiday, the day of the week may be insignificant.

In some examples. technologies and techniques are disclosed for a swarm trajectory in an ego-vehicle in which the determination of the swarm trajectory takes place. An ego-vehicle may be driven in a given driving lane, and given boundary conditions are determined on the part of the ego-vehicle while driving in the given driving lane. The determined boundary conditions are transmitted to a back-end computer that comprises a data base containing swarm trajectories for the currently driven lane to determine at least one swarm trajectory within these boundary conditions, and the at least one determined swarm trajectory is transmitted for the given driving lane to the ego-vehicle. The current driving trajectory is then compared with the swarm trajectory.

The ego-vehicle may determine which boundary conditions, or combination of boundary conditions, are used for determining the swarm trajectory in the data base. This can take place, e.g., in that only the selected boundary conditions are sent to back-end computer, such that it can also execute a data base search using only these boundary conditions. It is also conceivable to send numerous swarm trajectories to the ego-vehicle, corresponding to the number of boundary conditions and/or the desired combinations of boundary conditions.

The current driving trajectory for the ego-vehicle may be corrected of affected by the swarm trajectories that have been sent to the ego-vehicle, e.g., in that the difference between the current driving trajectory and the swarm trajectory is determined, and this difference is used to correct the current trajectory of the ego-vehicle.

FIG. 1 shows a schematic illustration of the determination of swarm trajectories depending on boundary conditions for a section of a road or route, wherein a fixed route segment is defined for the example shown. The method can be extended accordingly for further route segments, and the respective route segments form a parameter for processing these further sections.

As can be seen in the example, numerous vehicles F1, F2, . . . Fn−1, Fn travel a given route segment, by means of which each of the vehicles F1, F2, . . . Fn−1, Fn generates an individual trajectory T1, T2, . . . Tn−1, Tn on the route segment. Individual boundary conditions are assigned by devices in the vehicles F1, F2, . . . Fn−1, Fn to each trajectory T1, T2, . . . Tn−1, Tn for the route segment in question, in the form of parameter sets P1, P2, . . . Pn−1, Pn, wherein each trajectory T1, T2, . . . Tn−1, Tn is assigned at least the time parameter for when the given route segment is traveled. In addition to the time of day, the respective traffic conditions, the parking situation on the side of the road, the weather conditions, and/or the lighting, can also be taken into consideration as boundary conditions or parameters, which can be determined via corresponding devices for observing the environment. The boundary conditions are then combined to form a respective parameter set P1, P2, . . . Pn−1, Pn.

From a formal perspective, there is a given number of boundary conditions Rk, wherein the index k can assume the values 1 to m, i.e. k∈{1, . . . , m}, from which the parameter sets P1 to Pn for the trajectories T1 to Tn are formed. Consequently, a parameter set Pi with i∈(1, . . . , n) can be described as the following n-tuple:

$$Pi \subseteq \{Rj\ i, j \in 1, \ldots, k\}$$

In other words, there may be an infinite number of boundary conditions Rj, j∈{1, . . . k}, and the parameter set Pi comprises a subset of boundary conditions Rj from the set of all subsets, i.e., the power set of the set of all boundary conditions Rj.

In one example, the boundary conditions Rj can be defined as follows:
R1: date and weekday Mon. to Sun.,
R2: time of day in time intervals, e.g. in hours,
R3: weather, e.g., sunny, dry, drizzle, rain, snow, fog, ice,
R4: parking situation on the right side of the road, e.g. unoccupied, partially occupied, occupied,
R5: traffic conditions, e.g. light, medium, heavy, congested.

In the example with the specified five boundary conditions R1 to R5, the parameter set Pi belongs to the trajectory Ti, wherein the parameter set Pi comprises boundary conditions R1 to R5, thus forming the following n-tuple:

$$Pi = (R1, R2, R3, R4, R5),$$

where, e.g.:
R1=(weekday: Monday)
R2=(time interval: 2:00 PM to 3:00 PM)
R3=(weather: sunny and dry)
R4=(parking situation on right side of the road: unoccupied), and
R5=(traffic: light)

The boundary conditions R1 to R5 specified above and their values are only given as examples for purposes of explanation. In other examples, the boundary conditions and their specifications are adapted precisely to the situation.

The trajectories T1 to Tn, including the associated parameter sets P1 to Pn for each vehicle F1 to Fn are conveyed independently to a back-end computer BE, in particular wirelessly, via a transmission path ÜB, (e.g. a radio connection, mobile communications, etc.). The information can also be stored in the "test vehicles" F1 to Fn, and then sent in an arbitrary manner to the back-end computer after completion of the route.

The wirelessly transmitted information n-tuple (Ti, Pi) that includes the trajectory Ti for the vehicle Fi and the associated parameter set Pi BE are stored for further processing and compilation in a memory SP in the back-end computer BE.

The trajectories Ti are linked to one another with respect to their correlation to corresponding swarm trajectories ST, taking their associated parameters Pi into account in a device VK for processing and correlating the stored information n-tuple (Ti, Pi). In other words, a swarm trajectory ST is determined, e.g., a mean value for the trajectories Ti determined for these parameter sets, for specific combinations of boundary conditions Rj, i.e. specific parameter sets.

Assuming a total number of m trajectories Tm, m∈{1, . . . , n} is determined for a given parameter set Pi⊆{Rj i,j∈1, . . . , k} for a section of road observed in a testing period, m information n-tuples (Tm, Pi) are obtained. Consequently, the m trajectories can basically be regarded as a function of the parameter set Pi, i.e. Tm(Pi), and the swarm trajectory ST(Pi) is obtained as a function of the m information n-tuples, by simple averaging:

$$ST(Pi) = \Sigma_1^m Ti(Pi)/m$$

where the parameter set Pi can as in the example above. In other words, a swarm trajectory ST(Pi) is obtained for the parameter values Pi:

R1=(weekday: Monday)
R2=(time interval: 2:00 PM to 3:00 PM)
R3=(weather: sunny and dry)
R4=(parking situation on right side of the road: unoccupied), and
R5=(traffic: light)

Furthermore, this averaging is merely an example. Other means and methods for compilation and correlation of the determined trajectories are conceivable for a combination of boundary conditions.

The swarm trajectories ST(Pi) obtained from the correlations for a given parameter set Pi and the observed route segment are then stored in a knowledge data base DB such that they can be accessed from external sites.

Swarm trajectories can be generated not only for a so-called "complete" parameter set Pi(R1, . . . , Rm), which comprises all of the boundary conditions, but also for individual boundary conditions Ri, I∈{1, . . . , m} and for desired combinations of boundary conditions, e.g. Ri, j where i, j∈{1, . . . , m}, wherein the set of all boundary conditions Ri, i∈{1, . . . , m} comprises the combinations of all of the subsets.

It is also possible to determine other swarm trajectories ST(Ri, . . . , Rj) in this manner and store them in the back-end computer BE, wherein the conditions R1="Tuesday" and R2="2:00 PM-3:00 PM" or R1="Tuesday", R2="2:00 PM-3:00 PM" and R4="unoccupied" are sufficient. In this manner, the user receives information regarding what the swarm trajectory looks like for the specified weekday and the desired time interval, or for the weekday R1, time interval R2, and parking situation R4, without taking other secondary conditions into account, e.g. weather R3, parking situation R4, and traffic R5 in the first example, and weather R3 and traffic R5 in the second example.

In some examples, effects specific to a region are taken into account during the processing. As such, drivers react differently to boundary conditions in traffic, or take advantage of degrees of freedom to greater or lesser extents. Furthermore, the knowledge data base DB knows the swarm trajectories for different combinations of boundary conditions, and also knows the histories of different boundary conditions at the corresponding section of a roads.

Figure 2:
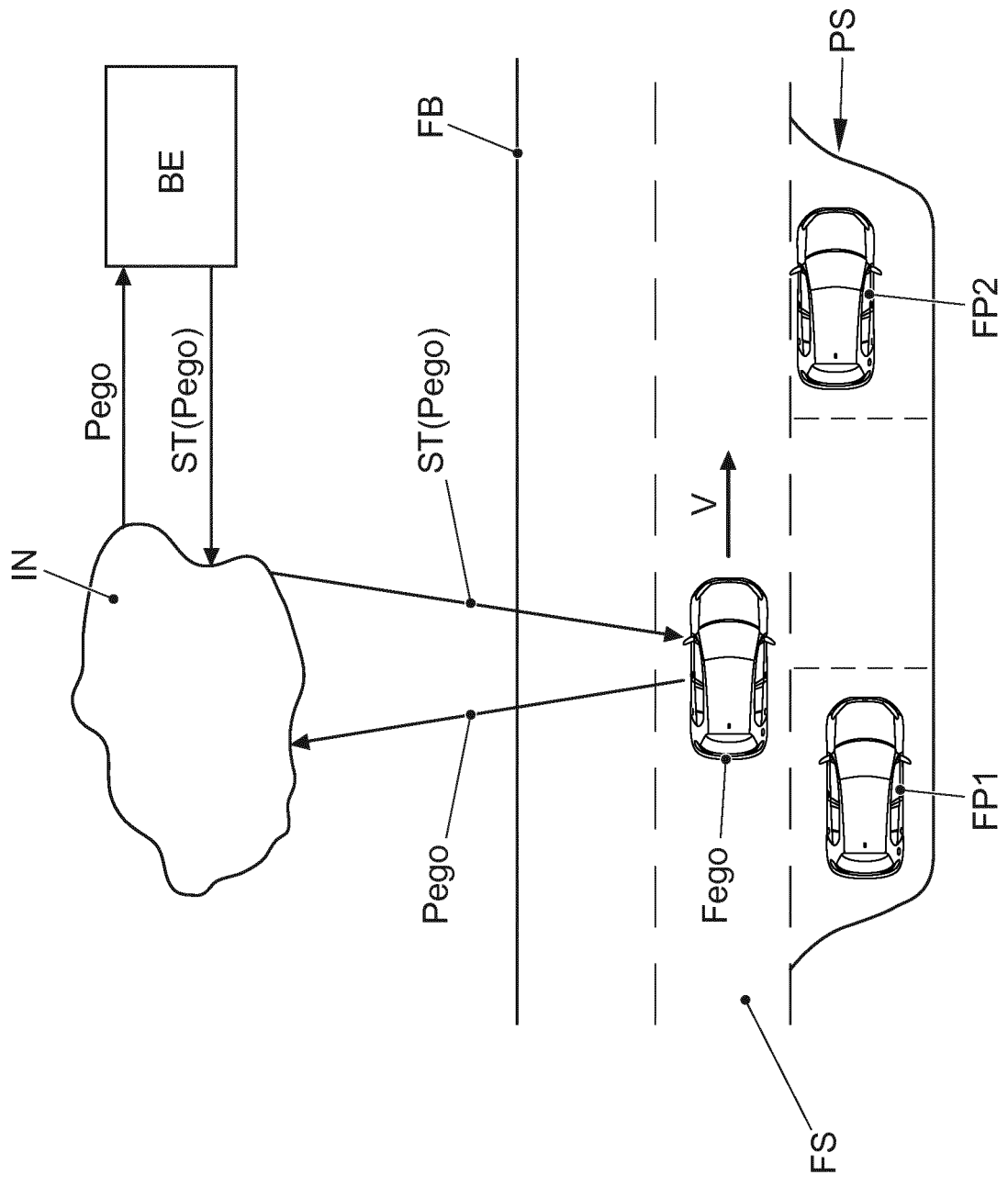
FIG. 2 shows the use of a swarm trajectory determined in this manner in a motor vehicle, in a schematic illustration.

FIG. 2 shows how a swarm trajectory is used in an ego-vehicle travelling on a specific section of a road, in a schematic illustration. An ego-vehicle $F_{ego}$ travels in a driving lane FS, for example, on an urban street along a parking lane PS on the right side of the driving lane FS at a speed v. The parking lane PS is partially occupied, in this case by two parked vehicles FP1 and FP2 in FIG. 2, wherein the second parked vehicle FP2 is very close to the driving lane FS in its parking space. It can therefore be expected that the trajectory of the ego-vehicle $F_{ego}$ when passing the second parked vehicle FP2 does not remain in the middle of the driving lane FS, but instead veers to the left of the middle of the driving lane FS in the direction of travel, to avoid the second parked vehicle FP2.

The ego-vehicle $F_{ego}$ assesses the respective necessary boundary conditions with its sensor system (not shown), e.g. the aforementioned boundary conditions R1 to R5 for the section of road FB on which the ego-vehicle $F_{ego}$ is currently located, which are then combined to form a parameter set $P_{ego}$. This parameter set $P_{ego}$ is transmitted to the relevant back-end computer BE using mobile communications via the schematically illustrated internet IN. The back-end computer BE determines a corresponding swarm trajectory $ST(P_{ego})$ based on this parameter set $P_{ego}$, which is then transmitted to the ego-vehicle Fego via the internet using the corresponding mobile communications connection, in which this swarm trajectory $ST(P_{ego})$ is used for planning and/or correcting the actual driving trajectory.

LIST OF REFERENCE SYMBOLS

F1 vehicle 1
F2 vehicle 2
Fi vehicle i
Fn−1 vehicle n−1
Fn vehicle n
T1 trajectory of vehicle 1
T2 trajectory of vehicle 2
Tn−1 trajectory of vehicle n−1
Tn trajectory of vehicle n
P1 parameter set for trajectory 1
P2 parameter set for trajectory 2
Pn−1 parameter set for trajectory n−1
Pn parameter set for trajectory n
ÜB transmission path
BE back-end computer
SP storage
VK processing and correlation
DB data base
SP memory
$F_{ego}$ ego-vehicle
FP1 first parked vehicle
FP2 second parked vehicle
PS parking lane
FB driving route
FS driving lane
$P_{ego}$ ego-vehicle parameter set
ST swarm trajectory
IN internet
v speed

The invention claimed is:

1. A method for providing control for one or more of a plurality of vehicles traveling a route segment via a swarm trajectory in a central computer, comprising:
   receiving, from the plurality of vehicles traveling the route segment, individual trajectories from each of the plurality of vehicles, wherein each trajectory comprises a parameter set based on one or more boundary conditions;
   processing the individual trajectories to generate a value for the trajectories relative to one or more configured parameter sets, wherein the value is based on one of an average value or mean value of the trajectories relative to the one or more configured parameter sets;
   generating the swarm trajectory based on the value; and
   transmitting the generated swarm trajectory to the one or more of the vehicles of the plurality of vehicle, wherein the swarm trajectory comprises data configured to modify the one or more vehicles driving trajectory.

2. The method of claim 1, wherein each of the individual trajectories comprise n-tuple information of a trajectory and parameter set.

3. The method of claim 2, wherein the one or more boundary conditions comprise a date, a day, a time of day interval, weather, parking situation and traffic condition.

4. The method of claim 1, wherein
the average value comprises a simple average of a function of the one or more configured parameter sets and the individual trajectories for an n-tuple information, and/or
the mean value comprises a mean value of trajectories determined for parameter sets for specific combinations of one or more boundary conditions.

5. The method of claim 4, wherein the one or more configured parameter sets comprises a combination of all of the one or more boundary conditions.

6. The method of claim 4, wherein the one or more configured parameter sets comprises a combination of some of the one or more boundary conditions.

7. The method of claim 1, wherein processing the trajectories to generate a value for the trajectories relative to one or more configured parameter sets comprises applying different weights to the boundary conditions.

8. A method for using a swarm trajectory for an ego-vehicle, comprising:
receiving, in a back-end computer, a trajectory and one or more parameter sets based on boundary conditions determined by the ego-vehicle for a currently driven lane;
processing, in the back-end computer, the trajectory and the one or more boundary conditions to determine that the trajectory and the one or more boundary conditions correspond with one or more stored trajectories and parameter sets based on one or more boundary conditions associated with at least one of a plurality of other vehicles;
generating, in the back-end computer, at least one swarm trajectory for the currently driven lane based on the processing wherein the at least one swarm trajectory is based on one of an average value or mean value of the corresponding trajectories relative to the one or more parameter sets; and
transmitting the at least one swarm trajectory to the ego vehicle, wherein the at least one swarm trajectory is configured to modify the driving trajectory of the ego-vehicle for the currently driven lane.

9. The method of claim 8, wherein the boundary conditions are determined by the ego-vehicle for a configured swarm trajectory.

10. The method of claim 8, wherein processing the one or more boundary conditions comprises determining differences between the one or more boundary conditions and the one or more stored boundary conditions, and, based on the determined differences, generating corrective boundary conditions for generating the at least one swarm trajectory.

11. The method of claim 8, wherein generating the at least one swarm trajectory comprises generating n-tuple information of a trajectory and parameter set.

12. The method of claim 8, wherein the one or more boundary conditions comprise a date, a day, a time of day interval, weather, parking situation and traffic condition.

13. A method providing control for one or more of a plurality of vehicles traveling a route segment via a swarm trajectory in a central computer, comprising:
receiving, from the plurality of vehicles traveling the route segment, individual trajectories from each of the plurality of vehicles, wherein each trajectory comprises n-tuple information of a trajectory and parameter set based on one or more boundary conditions;
processing the trajectories to generate a value for the trajectories relative to one or more configured parameter sets, wherein the value is based on one of an average value or mean value of the trajectories relative to the one or more configured parameter sets;
generating the swarm trajectory based on the value; and
transmitting the generated swarm trajectory to the one or more of the vehicles of the plurality of vehicle, wherein the swarm trajectory comprises data configured to modify the one or more vehicles driving trajectory.

14. The method of claim 13, wherein the one or more boundary conditions comprise a date, a day, a time of day interval, weather, parking situation and traffic condition.

15. The method of claim 13, wherein
the average value comprises a simple average of a function of the one or more configured parameter sets and the individual trajectories for the n-tuple information, and/or
the mean value comprises a mean value of trajectories determined for parameter sets for specific combinations of one or more boundary conditions.

16. The method of claim 13, wherein the one or more configured parameter sets comprises a combination of all of the one or more boundary conditions.

17. The method of claim 16, wherein the one or more configured parameter sets comprises a combination of some of the one or more boundary conditions.

18. The method of claim 13, wherein processing the trajectories to generate a value for the trajectories relative to one or more configured parameter sets comprises applying different weights to the boundary conditions.

* * * * *